Sept. 14, 1965        S. SCHNEIDER        3,206,669

ALTERNATING CURRENT ELECTROMECHANICAL TRANSDUCERS

Filed Feb. 9, 1961        5 Sheets-Sheet 1

INVENTOR.
STANLEY SCHNEIDER

BY Louis J. Knobbe

ATTORNEY

FIG. 2

*INVENTOR.*
STANLEY SCHNEIDER
BY *Louis J. Knobbe*
ATTORNEY

United States Patent Office 3,206,669
Patented Sept. 14, 1965

3,206,669
ALTERNATING CURRENT ELECTRO-
MECHANICAL TRANSDUCERS
Stanley Schneider, Costa Mesa, Calif., assignor to Beckman Instruments, Inc., a corporation of California
Filed Feb. 9, 1961, Ser. No. 88,051
4 Claims. (Cl. 323—43.5)

This invention relates generally to transducers and, more particularly, to electromechanical transducers adapted for use with alternating current.

It is frequently necessary in electronic and electromechanical systems to derive a variable level of alternating current from a fixed source. As the accuracy requirements for these systems become more stringent, certain limitations inherent in the prior art transducers become more apparent. Thus, the ordinary potentiometer comprising a resistance element and slider is not a low output impedance device. The voltage relationship between the input and output of the potentiometer is not, therefore, independent of the load impedance when it is low. A further limitation of the potentiometer when used with alternating current is that undesired quadrature voltages are generated by extraneous winding capacitances. The autotransformer, another transducer heretofore used with alternating currents, although having the required low output impedance, does not provide a sufficiently smooth and linear voltage adjustment for many applications.

The electrical limitations of these prior art devices have been partially overcome by the device described in a patent of L. B. Scott, No. 2,843,822, entitled "Precision Transducer." In this device, a multitap autotransformer provides basic voltage levels. Voltages intermediate the basic levels are derived by a potentiometer connected to the appropriate transformer taps through a multicontact switch. Although this device provides a low output impedance and low quadrature voltages, it requires a complicated gearing and contact structure to achieve the required contact switching. This mechanically complex structure is expensive to manufacture and increases the problem of achieving long, trouble free operation. Also, the switching mechanism becomes increasingly difficult and expensive to construct as it is decreased in size, thus substantially decreasing the feasibility of miniaturizing the component. Moreover, linearity errors of the transformer and potentiometer limit the accuracy of this transducer.

It is, therefore, the primary object of this invention to provide an improved alternating current transducer of low output impedance and fine resolution which does not require switching multiple electrical contacts.

It is another object of this invention to provide an alternating current transducer of low output impedance and fine resolution which does not require any gearing structure.

It is still another object of this invention to provide an improved alternating current transducer in which only the physical size of a potentiometer and autotransformer limit the amount by which it may be miniaturized.

A further object of this invention is to provide an alternating current transducer having improved electrical characteristics, for example, high input impedance, low output impedance, low quadrature voltage, and very low linearity errors.

Other and further objects, features and advantages of the invention will become apparent as the description proceeds.

Briefly, in accordance with a preferred form of the present invention, there is provided an autotransformer having a plurality of fixed taps placed at selected intervals along its winding. A precision potentiometer having a similar number of fixed taps placed at selected intervals along its resistance element is coupled to the autotransformer by connecting respective taps of the potentiometer with those of the autotransformer. Each segment of the potentiometer resistance element between a pair of taps is then energized by a fixed potential determined by the voltage between the associated taps of the autotransformer. A transducer so constructed has the desired electrical characteristic of high input impedance, low output impedance, and low quadrature voltages, and does not require that any potentiometer taps be switched since the respective potentiometer and autotransformer taps are permanently joined when the unit is manufactured. The resultant unit has the mechanical simplicity of a potentiometer and autotransformer but with greatly improved electrical characteristics.

The present invention can be constructed as a linear device in which the autotransformer and potentiometer taps are evenly spaced. By translating the location of the taps upon either the transformer or the potentiometer, or both, the linearity of the transducer can be improved very greatly over the linearity of the transformer and potentiometer per se. Also, by spacing these taps at arbitrary intervals, a nonlinear output can be achieved. In addition, a modification of this invention provides a transducer having effectively no "end resistance." "End resistance" or "residual resistance" as it is known in the art is the resistance between the potentiometer wiper and the end terminal with the wiper positioned mechanically to obtain the minimum resistance at the end being measured.

A more thorough understanding the invention may be obtained by the following detailed description taken in connection with the accompanying drawings in which.

Figure 1:
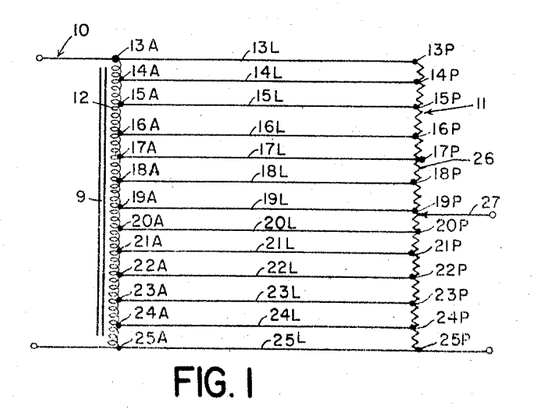
FIG. 1 is a schematic drawing of one embodiment of this invention.

Referring now to FIG. 1, there is shown a schematic of an embodiment of this invention which comprises an autotransformer 10 having a core 9. This core supports a winding 12 having a plurality of spaced taps 13A, 14A, 15A, 16A, 17A, 18A, 19A, 20A, 21A, 22A, 23A, 24A and 25A that divide the winding into twelve segments. The number of segments and the spacing are determined by the particular type of transducer desired and the physical type and size of components used. However, since the transducer output impedance varies inversely with the number of segments, the number of segments should be as large as practical.

A potentiometer 11 comprises a resistance element 26 and a movable wiper contact 27 which may be constructed in accordance with the usual design of such a unit. Resistance element 26 is provided with a plurality of spaced taps 13P, 14P, 15P, 16P, 17P, 18P, 19P, 20P, 21P, 22P, 23P, 24P and 25P corresponding to the taps of the autotransformer. The potentiometer taps are fixedly connected to respective autotransformer taps through leads 13L, 14L, 15L, 16L, 17L, 18L, 19L, 20L, 21L, 22L, 23L, 24L and 25L. The input terminals of the transducer are electrically identical with the end autotransformer taps 13A and 25A and the output terminals are electrically identical with end potentiometer tap 25P and movable potentiometer wiper contact 27. It will thus be seen that the mechanical structure of the invention shown in FIG. 1 is only slightly more complex than that of an individual autotransformer and potentiometer. No movable contacts are required between the devices since the leads 13L through 25L are permanently connected to the autotransformer and potentiometer when the unit is manufactured. The only movable parts are in the potentiometer itself; by using a precision potentiometer, an extremely reliable and trouble free unitary device can be constructed.

By way of illustration only, the following specific components are given as typical of those which may be used to construct a transducer embodying the present invention. The core 9 of autotransformer 10 comprises a core No. 2T-7699-S2, manufactured and sold by the Arnold Engineering Company, Marengo, Illinois. This core is a toroid having an outside dimension of 1.250 inches, an inside dimension of 1.000 inch and a height of 0.250 inch; it is tape wound from "Supermalloy," a 78 percent nickel-iron alloy of very high permeability. Upon this core are wound 7200 turns of No. 36 enameled wire, the winding being divided into 12 segments with 600 turns per segment. The potentiometer is a Model 7600 Helipot potentiometer, a precision multi-turn potentiometer manufactured by the Helipot Division of Beckman Instruments, Inc., Fullerton, California, assignee of the present invention, modified so that the resistance element is divided into twelve equal segments. Suitable leads fixedly interconnecting respective taps on the autotransformer and potentiometer complete this transducer.

Figure 2:
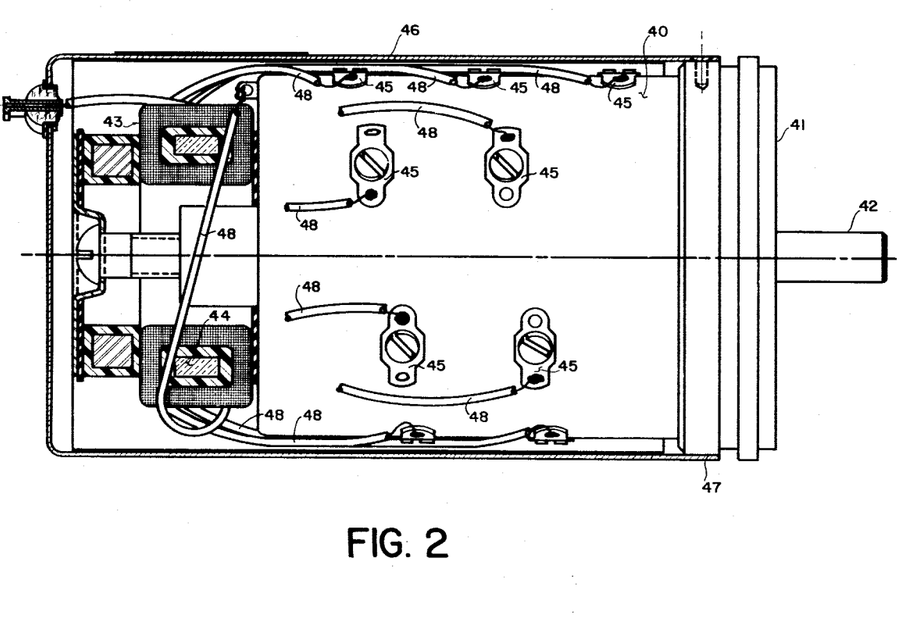
FIG. 2 is a view, in side elevation, of one embodiment of an alternating current transducer constructed in accordance with this invention.

In FIG. 2 is illustrated a structural embodiment of this invention utilizing the specific components given above. A multi-turn potentiometer 40 is mounted to a face plate 41 with its operating shaft 42 extending therethrough. At the other end of the potentiometer and mounted thereto is a transformer 43 having a toroidal core 44 and a suitably tapped autotransformer winding wound thereon. The potentiometer winding is also tapped at a plurality of predetermined points and connected to external terminals 45, each of which is electrically connected to corresponding taps of the autotransformer 43 by electrical leads 48. A cup-shaped cover 46, mounted with its open end attached to a shoulder 47 of the face plate 41, completes the transducer.

The electrical characteristics of transducers constructed in accordance wtih the present invention are as follows: Where particular values are given for illustrative purposes, they relate in each case to the specific embodiment described hereinabove. Referring now to the circuit of FIG. 1, the input impedance is determined by the parallel connection of the autotransformer and potentiometer. It is usually desirable that the input impedance have a high value and such is achieved by utilizing a transformer having an impedance substantially higher than the associated potentiometer resistance element. In the specific embodiment described hereinabove, the high permeability core material yields a transformer having an impedance exceeding one megohm at 400 c.p.s. With a potentiometer resistance of 100K ohms, the input impedance is approximately equal to that of the potentiometer resistance element since it is substantially unaffected by the very high transformer impedance in parallel therewith. However, it will be understood that this invention is not limited to the use of high impedance transformers since in some instances a low impedance transformer will be deliberately chosen for the transducer. For example, it may be wished to produce a transducer having a finer resolution than that afforded by the potentiometer having the desired input impedance. A potentiometer having additional windings with attendant higher resistance may then be selected and shunted by a transformer having an appropriate low impedance to provide the required input impedance.

Figure 3:
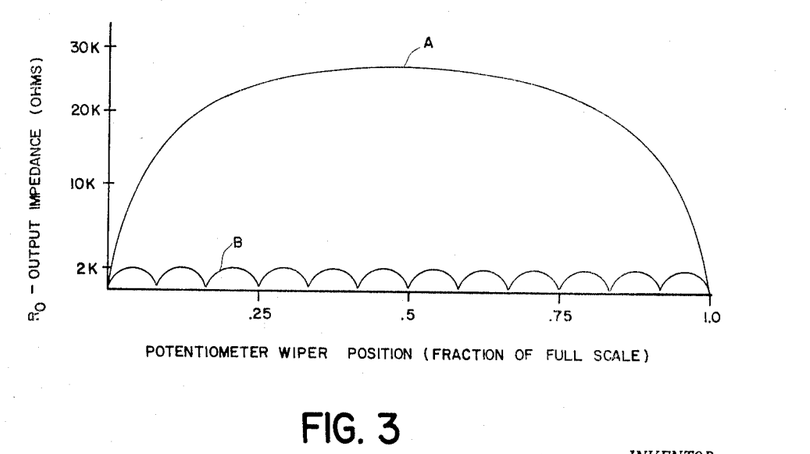
FIG. 3 is a logarithmic graph in which output impedance as a function of potentiometer wiper position is plotted for a potentiometer per se and a transducer constructed in accordance with this invention.
Figure 4:
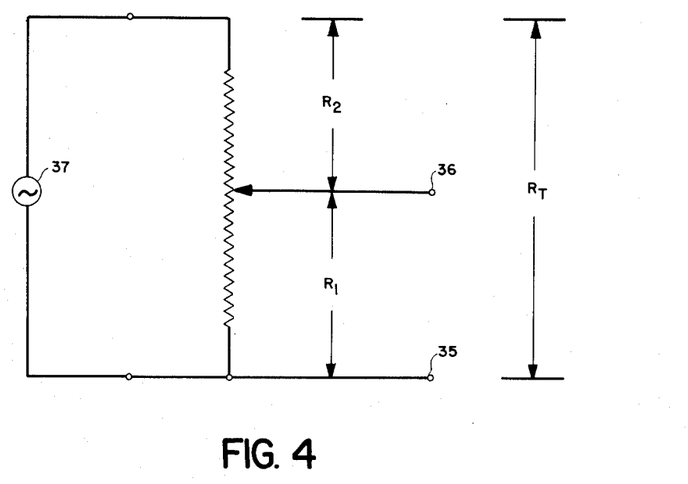
FIG. 4 is a schematic diagram of a potentiometer.

FIG. 3 is a graph in which output impedance as a function of potentiometer wiper position is plotted for both a potentiometer per se (curve A) and a transducer constructed in accordance with this invention (curve B). By way of example, actual numerical values derived from the specific transducer embodiment above are shown in FIG. 3. A generalized potentiometer is shown in FIG. 4 as including a potentiometer having a total resistance of $R_T$. As shown, the resistance between the fixed output terminal 35 and the movable wiper contact 36 is denoted as $R_1$ and the resistance between the movable contact 36 and the extreme end of the resistance element is denoted as $R_2$. A voltage is applied across the entire resistance $R_T$ by an alternating current source 37. As shown in curve A of FIG. 3, the impedance between the fixed contact 35 and movable contact 36 of this generating potentiometer is substantially zero when the movable contact is located at the outer taps of the resistance element. This will be valid so long as the input power source represented by alternating current course 37 has a very low impedance. This is ordinarily a valid assumption and conforms with the accepted mode of measuring potentiometer output impedance in which the input thereof is shorted. The mathematical equation for the output impedance $R_{0A}$ may be derived as:

$$R_{0A} = R_1 - \frac{R_1^2}{R_T} \quad (1)$$

The point of maximum output impedance is located at the center of a linear resistance element; at this position, $$R_1 = \frac{R_T}{2} \quad (2)$$

Substituting from Equation 2 into Equation 1, the maximum output impedance for the potentiometer shown in FIG. 4 is:

$$R_{0A_{max.}} = \frac{R_T}{4} \quad (3)$$

Thus, for the specific potentiometer of 100K ohms, the maximum output impedance is 25K ohms.

Figure 5:
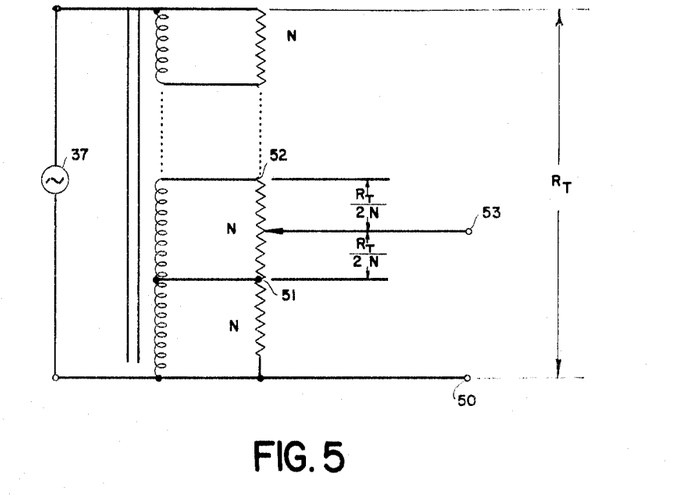
FIG. 5 is a generalized schematic for transducers constructed in accordance with this invention.

A generalized transducer constructed in accordance with this invention is shown in FIG. 5 as including a potentiometer having a total resistance of $R_T$ is divided into N sections so that the resistance of each section is $R_T/N$. With a low impedance power source connected across the autotransformer, the impedance looking back between fixed contact 50 and any of the taps 51, 52, etc., will be substantially zero since the impedance of alternating current source 37 is low. The maximum output impedance of the transducer is presented when the movable contact 53 is located at the middle of any one of the N sections. The output impedance between fixed contact 50 and movable contact 53 will then be approximately equal to the parallel impedance of two resistances each having $R_T/2_N$ ohms impedance. Curve B of FIG. 3 therefore comprises N individual curves (N being 12 for the specific described embodiment) each having the shape of curve A but being substantially lower in amplitude. The maximum output impedance $R_{0B}$ for the transducer of FIG. 5 is:

$$R_{0B_{max.}} = \frac{R_T}{4_N} \quad (4)$$

As shown in Equation 4, the output impedance is inversely proportional to the number of resistance element and autotransformer winding segments. Thus, the maximum output impedance of the specific transducer embodiment described above and plotted in FIG. 3 as curve B is only slightly more than 2K ohms, compared with 25K ohms when the intermediate taps are not interconnected.

It will be apparent from Equation 4 that the potentiometer resistance element and autotransformer winding should be divided into a substantial number of N segments in order to obtain the desired low output impedance. Although these segments serve to lower the output impedance, they do not affect the input impedance of the transducer which remains at the desired high value.

Figure 6:
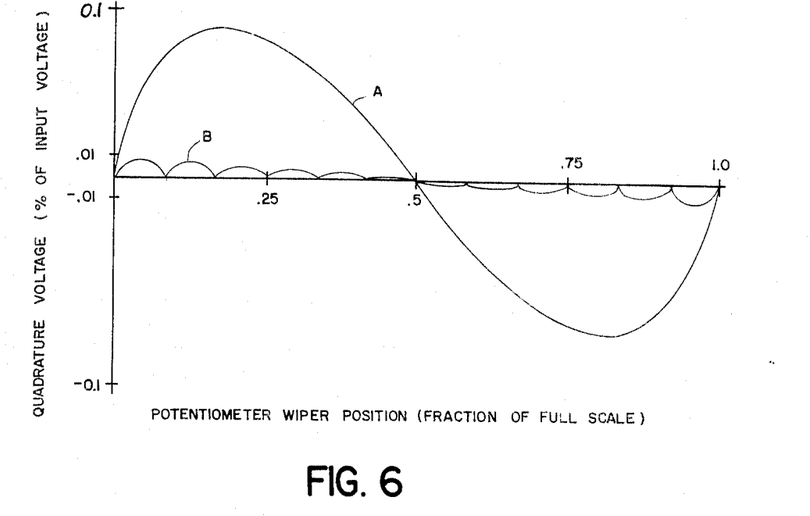
FIG. 6 is a graph in which quadrature voltage as a function of potentiometer wiper position is plotted for a potentiometer per se and a transducer constructed in accordance with this invention.

The reduction of quadrature voltages achieved by this invention is clearly illustrated by the graph of FIG. 6. Curve A illustrates the quadrature voltage between the fixed and movable contacts of the aforementioned Model 7600, 100K potentiometer at a frequency of 400 c.p.s. and is representative of potentiometers in which the resistance wire is wound to a predetermined pitch on a support or mandrel as it is known in the art, constructed of insulated copper wire. This type of mandrel is used because it has uniform diameter, good heat conductivity, and high thermal capacity. A disadvantage of such construction is the relatively large distributed capacitance between the resistance winding and the mandrel which produces the out-of-phase quadrature voltage illustrated by curve A. Other types of potentiometers also produce quadrature voltages although usually of lesser amplitude than the copper mandrel type potentiometer. A more detailed description and analysis of quadrature errors may be found in technical paper No. 497, entitled "AC Performance and Phase Compensation of Copper-Mandrel Potentiometers," by Benjamin F. Logan, and technical paper No. 552, entitled "Measurement and Correction of Phase Shift in Copper-Mandrel Precision Potentiometers," by Stanley Schneider et al., both of which are made publicly available by the Helipot division of Beckman Instruments, Inc., assignee of the present invention.

Curve B of FIG. 6 illustrates the quadrature voltage resulting when the Model 7600 potentiometer is incorporated in the twelve segment transducer hereinbefore described. As shown, the quadrature voltages are substantially reduced and are close to zero for the entire length of the potentiometer resistance. This decrease results from the plurality of interconnected taps between the potentiometer and autotransformer; such taps force the voltage upon the potentiometer resistance element to be substantially in phase with the source voltage at each of the common tap positions. Thus, the reduction in magnitude of the quadrature voltage is substantially proportional to the number of segments.

Figure 7:
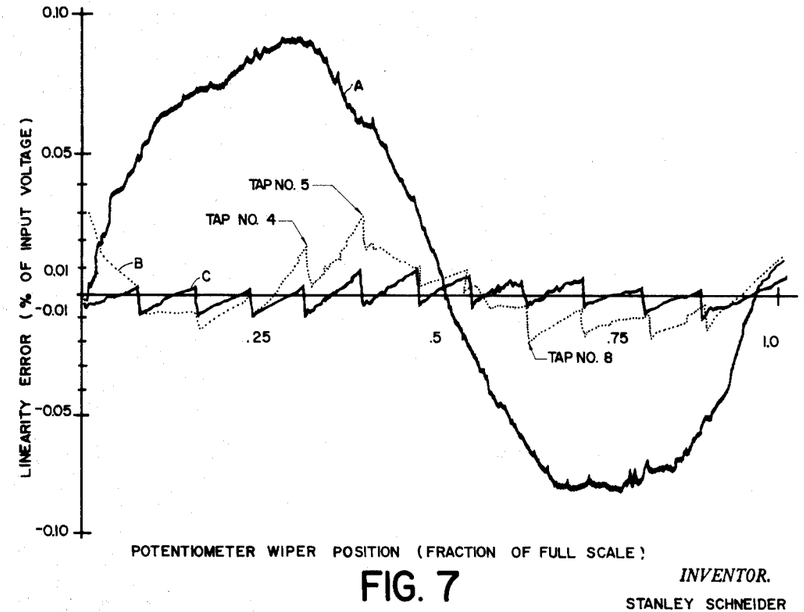
FIG. 7 is a graph in which linearity error as a function of potentiometer wiper position is plotted for a potentiometer per se and a transducer constructed according to this invention.

The present invention also allows transducers to be constructed with greatly improved linearity over the transformer and potentiometer components per se. The variance in linearity from absolute linearity is illustrated by curve A of FIG. 7 for a representative potentiometer energized by 400 c.p.s. alternating current. This curve, as are also the others illustrated in FIG. 7, is derived by comparing the output of the potentiometer or transducer with the output of a master potentiometer when the wiper contacts of both are driven simultaneously and both devices are energized by the same alternating current. The master potentiometer is designed to have extremely precise linearity and very low quadrature voltage; therefore, any deviation in the output of the potentiometer or transducer under test from the output of the master potentiometer is a true measure of absolute linearity error. The specific percentage values of linearity error are for the Model 7600 Helipot potentiometer. A substantial portion of the linearity error of this and like potentiometers is caused by the out-of-phase quadrature voltages previously described and illustrated in FIG. 6. Accordingly, an improvement in linearity is provided by dividing the resistance element of the potentiometer into segments and interconnecting each of the segments with like segments of a transformer in the manner of the present invention. Moreover, a further improvement in linearity is provided by the interconnection of the transformer and potentiometer taps in the manner described since the voltage at each of the potentiometer taps is forced to assume the transformer tap voltage. The voltage at each of the transformer taps is substantially proportional to the transformer turns ratio at the respective taps; therefore, if care is taken in assuring that the transformer and potentiometer taps are placed exactly, the resultant transducer will have a very low linearity error substantially dependent upon the linearity of each segment of resistance element. If each segment is made very short by using a number of interconnected transformer and potentiometer taps, a very linear transducer may be achieved.

This invention also enables an extremely linear transducer to be constructed even though errors are made in placing the taps upon the transformer and potentiometer. Ordinarily, economic factors dictate that a certain tolerance be allowed for positioning the taps. For a transformer having a number of turns, 5000–10,000 for example, the tap placement for some or all of the taps may vary by a few turns from the precise tap location. Similarly, extreme care with resultant high cost would be required to place exactly the taps upon the potentiometer resistance element. Generally, a tolerance is allowed for their placement so that some or all of the potentiometer taps vary slightly from their exact position. Accordingly, the transducers constructed by interconnecting the transformer and potentiometer taps initially provided do not usually have the lowest possible linearity error. The linearity of transducers so constructed can, however, be further improved by translating the individual taps on either the transformer or the potentiometer, or both. Ordinarily, the taps upon the transformer are more easily translated, preferably according to the teachings of the copending patent application of Kenneth W. McCoig, Serial No. 88,085, entitled "Improved Inductance Elements Having One or More Taps and Method of Constructing Same," filed on even date herewith and assigned to Beckman Instruments, Inc., assignee of the present invention.

Curves B and C of FIG. 7 illustrate the linearity improvement achieved with suitable translation of the interconnected taps. Curve B illustrates the linearity error of a transducer constructed according to the invention utilizing the particular components hereinabove described with the taps as initially provided. As shown, the maximum linearity error has been reduced from ±0.10% to ±0.03%. Also, the output voltages at the end terminals and taps Nos. 4, 5 and 8 represent substantially higher linearity errors than at the remaining taps. The linearity error at the end terminals is caused by end or residual potentiometer resistance which is more fully explained hereinafter as is also a modification of the present invention which substantially obviates the effect of this resistance. The output voltages at taps Nos. 4 and 5 respectively may be lowered and the output voltage at tap No. 8 may be increased by moving these taps on the transformer to change the turns ratio at these points the appropriate amount. For example, for the specific transformer described hereinabove having 7200 turns, an input voltage of 72 volts would result in a voltage between each winding of 0.01 volt. Accordingly, the voltage at each tap of this transformer under these operating conditions may be raised or lowered 0.01 volt for each winding turn that the tap is displaced. Obviously, smaller increments may also be afforded by translating the tap only a fraction of a complete winding turn in the manner taught by the copending application entitled "Improved Inductance Elements Having One or More Taps and Method of Constructing Same," supra.

Curve C is illustrative of the low linearity error which is characteristic of transducers constructed according to this invention when both the end resistance is compensated as described hereinafter and the necessary taps such as taps Nos. 4, 5 and 8 are translated the required amount. The resultant low linearity error shown of ±0.01% is dependent largely upon the physical construction of the precision potentiometer. The resolution of wire wound mandrel resistance element is finite and determined by the number of effective turns of resistance wire on the resistance element; this results in the small fluctuations in each of the curves of FIG. 7. The resolution of the potentiometer is further affected by multiple turns of the resistance element being shorted by the potentiometer wiper. It will be apparent that the wiper contact surface must be at least long enough to contact two adjacent turns of the resistance wire in order to maintain circuit continuity during wiper movement. It is also normally essential for the protection of resistance wire from undue wear. In practice, a wiper will normally contact and short more than two turns; after some use and wear shorting five or more turns is not unusual. The illustrated abrupt changes in linearity error at each of the tap points are the result of this shorting of turns by the wiper contact.

The steps just described for constructing extremely linear transducers provide a substantial improvement over conventional adjusting practices in which one or more sections of a potentiometer are shunted. The utilization of the present invention does not affect output voltages in any segments other than the two adjacent to the tap being translated, whereas the addition of a shunt across any section affects the output voltage of all sections.

Although the description above refers to the construction of an ultralinear transducer, it will be readily apparent that nonlinear transducers can also be constructed by unequal spacing of tap connections on the transformer and potentiometer. For example, the transducer may have one or more outputs 180° out-of-phase with the input over any desired portion of the potentiometer by either positioning the fixed output tap of the potentiometer to a position other than the end of the resistance element, or rearranging the interconnecting leads between the multi-tap potentiometer and transformer, or both.

It has been shown that the electrical characteristics of this invention are improved by the use of a plurality of fixed connections between respective spaced taps of the potentiometer and transformer. The number of taps which may be utilized generally will be determined by the physical size of the potentimeter and transformer, the allowable cost of the component, and the required electrical characteristics. Since each tap requires a finite amount of space on both the transformer and potentiometer, the size of the components will obviously affect the practical number which may be utilized. Also, each additional tap increases the cost of the transducer, usually, therefore, the number of taps selected will be a compromise between cost and accuracy. For most transducers constructed with presently available components, eleven taps dividing the transformer winding and potentiometer resistance into twelve segments has been found to be an effective compromise. As shown by the curves of FIGS. 3, 6 and 7, twelve segments substantially lower the transducer output impedance, quadrature voltage, and linearity errors. For transducers having very low output impedance and linearity errors, as many as twenty-four segments have been provided using presently available transformer cores and precision potentiometers.

Figure 8:
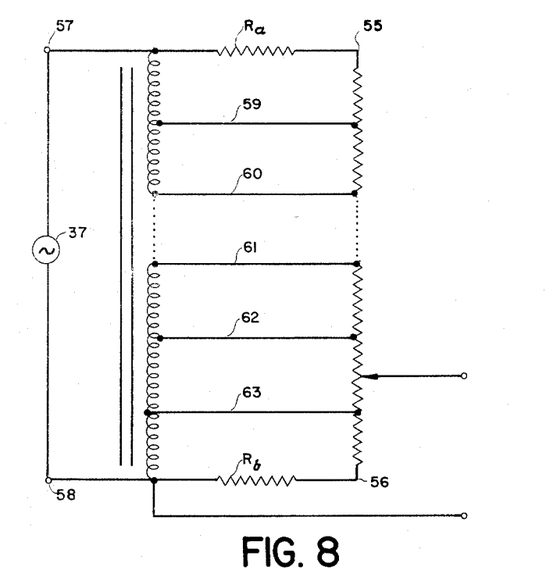
FIG. 8 illustrates schematically the resistance of a potentiometer.

A modification of the transducer shown in FIG. 1 makes it possible to construct transducers with effectively zero "end resistance," that is, with zero resistance between point 55 (FIG. 8), the uppermost point of contact of the wiper and terminal 57 of the source 37; or point 56, the lowest point of contact of the wiper and terminal 58 of the source 37. Potentiometers presently known in the art have a finite end resistance between the wiper contact and the reference source when the slider contact is at the points of minimum and maximum output voltage. Thus, in wire wound potentiometers, the taps to the resistance element are not exactly coincident with the movable slider contact. Usually, for example, a weld connection is made to the resistance wire at a point on the mandrel other than that traversed by the wiper contact. In other types of potentiometers it has also been found to be very difficult, if not impossible, to reduce the end resistance to zero. Thus, there is always a small impedance in series with the wiper contact and the input terminals at the lowest and uppermost points of slider contact. For illustrative purposes these erroneous end resistances are shown schematically in FIG. 8 as resistances $R_a$ and $R_b$ in series with respective taps 55, 56 of the potentiometer and terminals 57, 58 of alternating current source 37. These erroneous end resistances prevent the construction of an absolutely linear device since the minimum output voltage is not zero, but is instead the voltage drop across $R_b$, when the wiper engages point 56. In like manner, the maximum output voltage is not the full output of source 37, but is instead this voltage minus the voltage drop across $R_a$ when the wiper engages point 55. Resistances similar to $R_a$ and $R_b$ also exist in the leads 59, 60, 61, 62 and 63 which fixedly interconnect respective taps of the potentiometer resistance element and the transformer winding, but these do not have a net effect on linearity.

Figure 9:
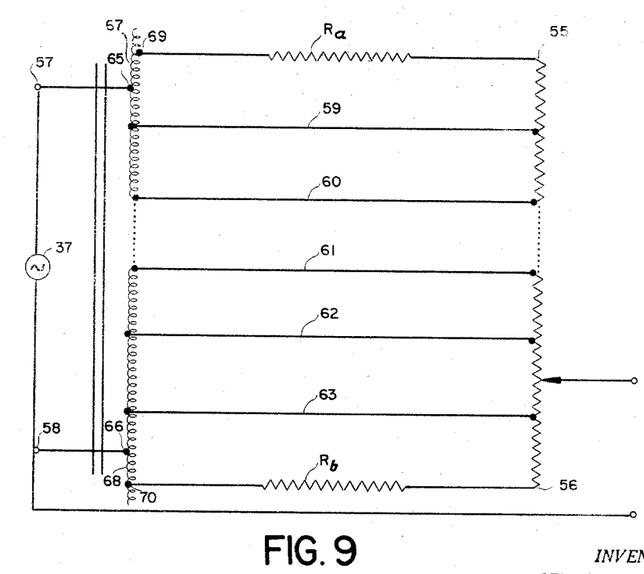
FIG. 9 is a schematic of another embodiment of this invention which cancels the effect of end resistance.

The effect of the impedances $R_a$ and $R_b$ is obviated according to the present invention in the embodiment of FIG. 9. The transducer of FIG. 9 is substantially identical to the transducer shown in FIG. 1 and described above, modified by connecting terminals 57 and 58 of the alternating current source 37 to autotransformer taps 65 and 66 which are displaced from the ends of the transformer winding. Autotransformer coil increments 67 and 68 are therefore placed in series with the potentiometer winding and source 37. By appropriately positioning taps 65 and 66, the voltages induced in the coil increments 67 and 68 by transformer action can be made respectively equal in magnitude and opposite in phase to the voltage drops across the resistances $R_a$ and $R_b$. The voltage drops across these resistances are then cancelled and the voltages sensed at taps 55, 56 of the potentiometer are the same respectively as the voltages at the alternating current source terminals 57 and 58, thereby providing a transducer of substantially improved linearity.

A preferred method of constructing the transducer shown schematically in FIG. 9 comprises initially measuring the output potential of the potentiometer alone when the wiper is mechanically positioned to obtain the minimum and maximum output voltages. The deviation in these values from zero volts as the minimum and the source voltage as the maximum represent the voltage drops across the end resistances $R_a$ and $R_b$ since, as previously shown in FIG. 6, the quadrature voltages are zero at the beginning and end of the wiper travel and do not contribute any error at these positions.

After measuring the voltage drop across the end resistances, the number of turns required in the increments 67 and 68 may be computed knowing the total number of turns comprising the transformer winding. The end terminals 69 and 70 are then translated the appropriate amount to provide increments 67 and 68 having the proper number of turns. Preferably, this translation is accomplished in the manner described in the copending application of Kenneth W. McCoig entitled "Improved Inductance Elements Having One or More Taps and Method of Constructing Same," supra. Linear transducers constructed in this manner have segments of equal length between the input terminals 65 and 66 since the position of the input terminals remain unchanged from their original position, whereas if the increments were provided by translating the input terminals 65 and 66 from their original position, the total number of turns between the input terminals would be reduced thereby effecting a change in the turns ratio of each transformer segment. Also the first and last transformer segments would have less turns than the others, thereby introducing a linearity error at the respective inner tap positions.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A transducer comprising a transformer winding having a plurality of spaced taps intermediate a pair of end connections, a resistance element having a plurality of spaced taps intermediate a pair of end connections, means electrically interconnecting respective taps and end connections of said transformer winding with those of said resistance element, input means connected between taps on said transformer winding which are intermediate said end connections of said transformer winding thereby providing a number of turns of transformer winding disposed between the respective input means to said transformer winding and said end connections thereof connecting with said end connections of said resistance element, said turns of transformer winding being sufficient to generate a voltage that is opposite in phase and substantially equal in magnitude to the voltage drop across said respective end connections and taps so that the effective voltage drop across said end connections and taps due to end resistance is negligible, and output means connected between one of said end connections of said resistance element and a movable contact thereon.

2. A variable resistance element comprising a resistance element, a fixed end connection and a movable contact on said resistance element, a transformer winding in series with said fixed end connection, and means for generating a voltage across said transformer winding opposition in phase and substantially equal in magnitude to the voltage drop across the end of resistance of said end connection of said resistance element so that the effective voltage drop across the end resistance of said fixed end connection is negligible.

3. A potentiometer comprising a resistance element, fixed contacts upon each end of said resistance element, a movable contact upon said resistance element, transformer windings respectively in series with said fixed end connections, and means for generating voltages across each of said windings which are opposite in phase and substantially equal in magnitude to the voltage drops across the end resistance of said respective potentiometer fixed contacts so that the effective voltage drop across said end resistance of said fixed contacts is negligible.

4. A transducer having very low linearity errors comprising a transformer winding, a pair of input terminals coupled to said transformer winding, a resistance element having fixed end connections creating certain "end resistances" with said resistance element, a plurality of spaced fixed taps electrically attached to said resistance element intermediate said fixed end connections, a movable contact on said resistance element, means for fixedly interconnecting each of the taps of said resistance element to respective taps of the transformer, said transformer taps being positioned so that each of the voltages measured between the fixed end connections and said resistance taps fall upon an absolute linearity curve, and means connecting increments of said transformer in series with respective transducer input terminals and end connections of said resistance elements, said increments having respective voltages induced therein opposite in phase and substantially equal in magnitude to the voltage drops across respective "end resistances" of said resistance element.

References Cited by the Examiner

UNITED STATES PATENTS 2,572,545  10/51  Walker _______________ 323—43.5

FOREIGN PATENTS 704,535  4/41  Germany.

LLOYD McCOLLUM, *Primary Examiner.*

MILTON O. HIRSHFIELD, *Examiner.*

UNITED STATES PATENT OFFICE
CERTIFICATE OF CORRECTION

Patent No. 3,206,669

September 14, 1965

Stanley Schneider

It is hereby certified that error appears in the above numbered patent requiring correction and that the said Letters Patent should read as corrected below.

Column 4, line 62, for "$R_T/2_N$" read -- $R_T/2N$ --; lines 69 and 70, for that portion of the formula reading $=\dfrac{R_T}{4_N}$ read $=\dfrac{R_T}{4N}$ Signed and sealed this 26th day of July 1966.

(SEAL)
Attest:

ERNEST W. SWIDER
Attesting Officer

EDWARD J. BRENNER
Commissioner of Patents